United States Patent [19]

Schippers

[11] 3,968,989
[45] July 13, 1976

[54] ENCLOSURE STRUCTURE

[76] Inventor: Ronald Schippers, R.R. 1, P.O. Box 155, Thomson, Ill. 61285

[22] Filed: July 18, 1974

[21] Appl. No.: 489,499

[52] U.S. Cl. .................................. 296/29; 56/271; 56/282; 296/31 R
[51] Int. Cl.² .......................................... B62D 27/00
[58] Field of Search ............ 296/29, 30, 31 R, 31 P, 296/28 J, 23 R; 52/271, 282, 281, 241, 270, 753 J, 758 D, 627, 272, 588

[56] References Cited
UNITED STATES PATENTS

| | | | |
|---|---|---|---|
| 157,399 | 12/1974 | Holmes | 52/282 |
| 1,857,913 | 5/1932 | Judelson | 52/282 |
| 2,235,662 | 3/1941 | Arehart | 296/29 |
| 3,003,810 | 10/1961 | Kloote et al. | 296/31 P |
| 3,496,689 | 2/1970 | Nerem | 296/31 P |
| 3,637,252 | 1/1972 | Metsker | 296/31 P |
| 3,692,354 | 9/1972 | Tuerk | 52/282 |

FOREIGN PATENTS OR APPLICATIONS

| | | | |
|---|---|---|---|
| 1,466,467 | 1/1967 | France | 52/281 |

Primary Examiner—Robert J. Spar
Assistant Examiner—Winston H. Douglas
Attorney, Agent, or Firm—Gordon W. Hueschen

[57] ABSTRACT

An enclosure structure suitable for use in constructing fixed enclosures, trailers, travel trailers, motor homes, buses, and mobile homes, comprising a plurality of wall panels, top panels, and bottom panels, at least one of the panels having a structural frame formed of elongate frame members welded together, each frame member having a tubular member and a channel-forming member of L-shaped cross-section affixed at one edge to the tubular member and cooperating therewith to define a channel, the frame having an insulating material such as a foam plastic arranged intermediate the frame members and outer walls formed of plywood and sheet metal or panels formed of fiberglass and resin. Adjacent panels disposed substantially at right angles to the channel-containing panel have their edges disposed within the channels and means such as screws affixing the channels to the engaged panels.

33 Claims, 11 Drawing Figures

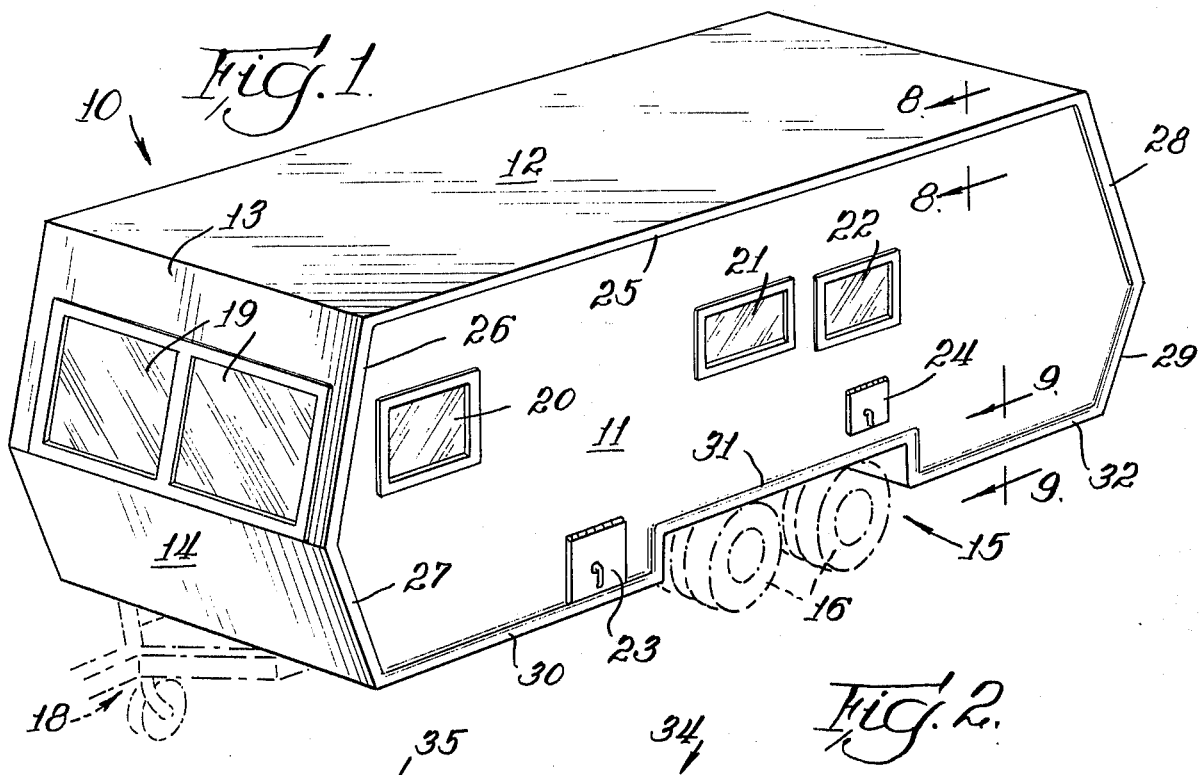
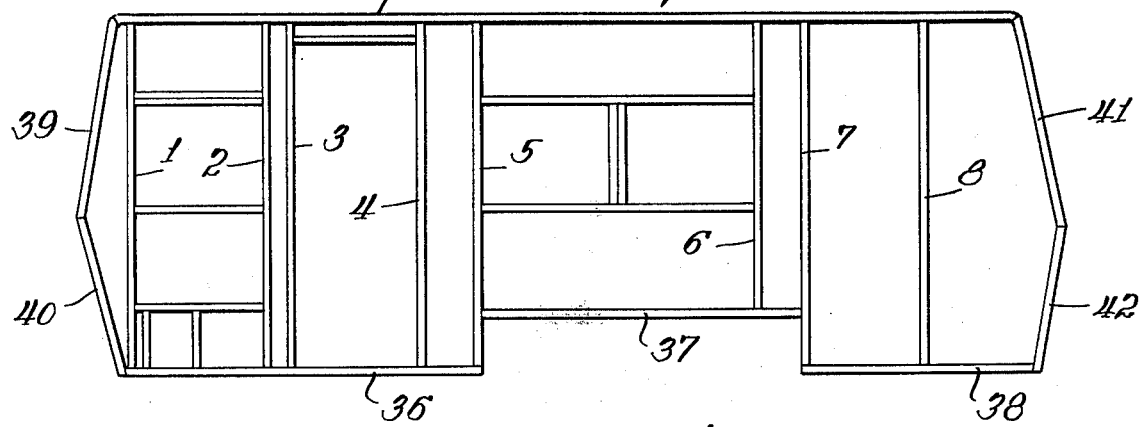
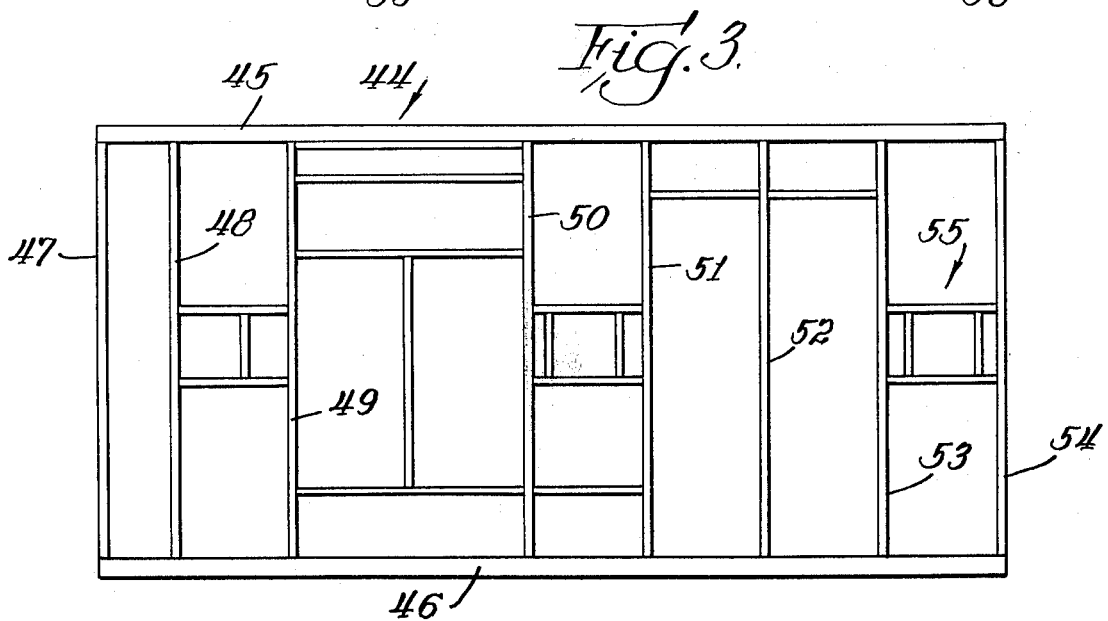

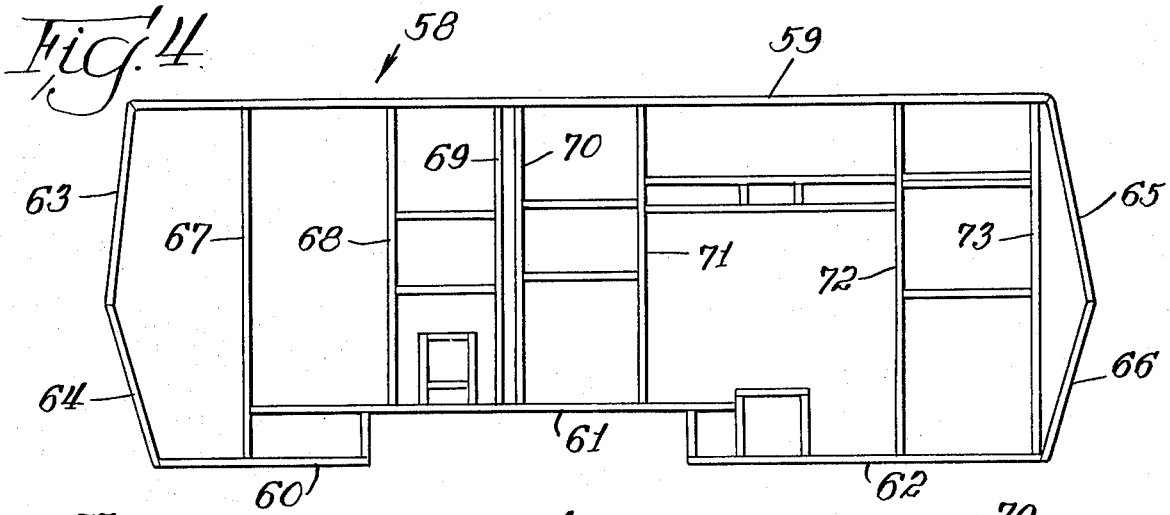
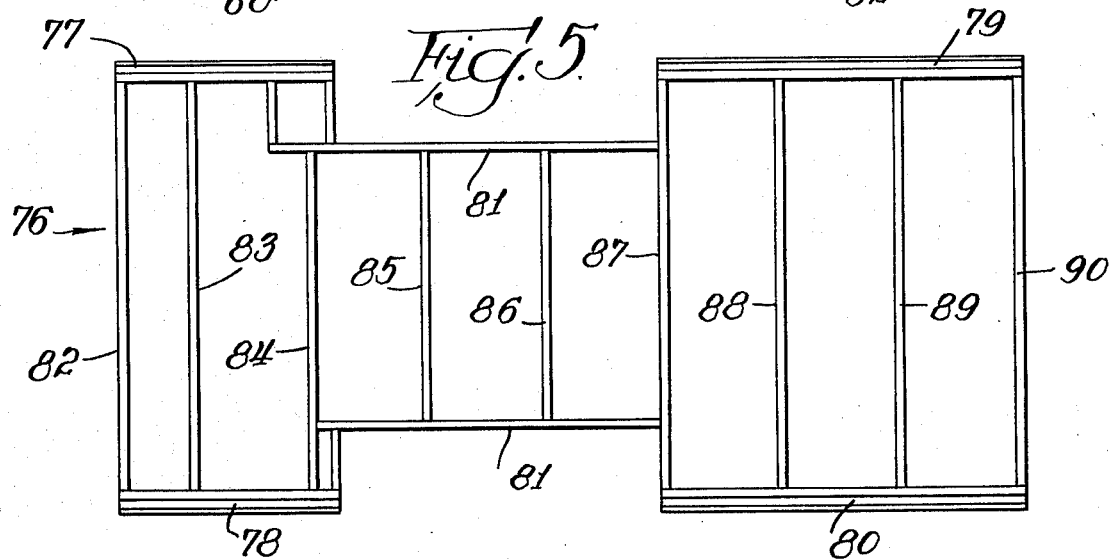
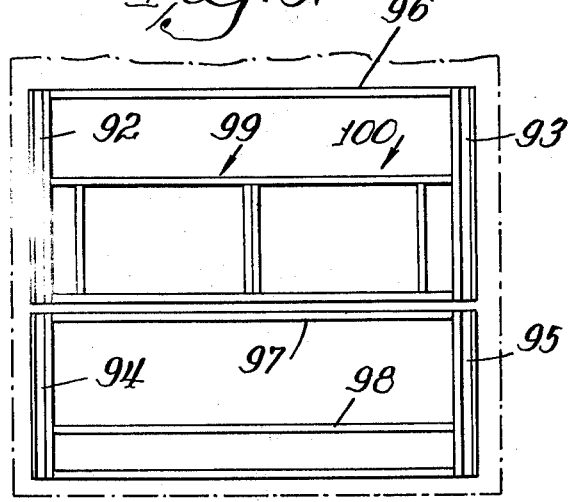
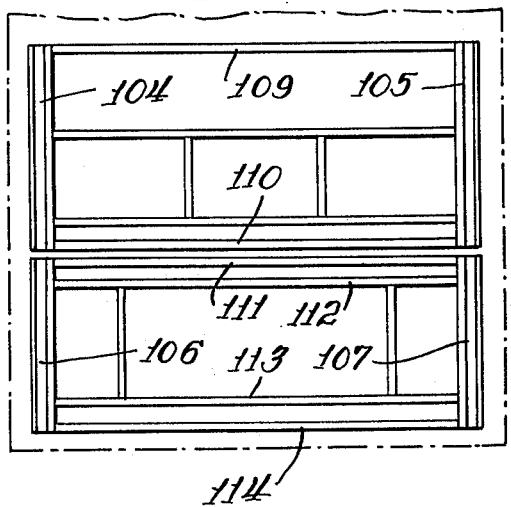

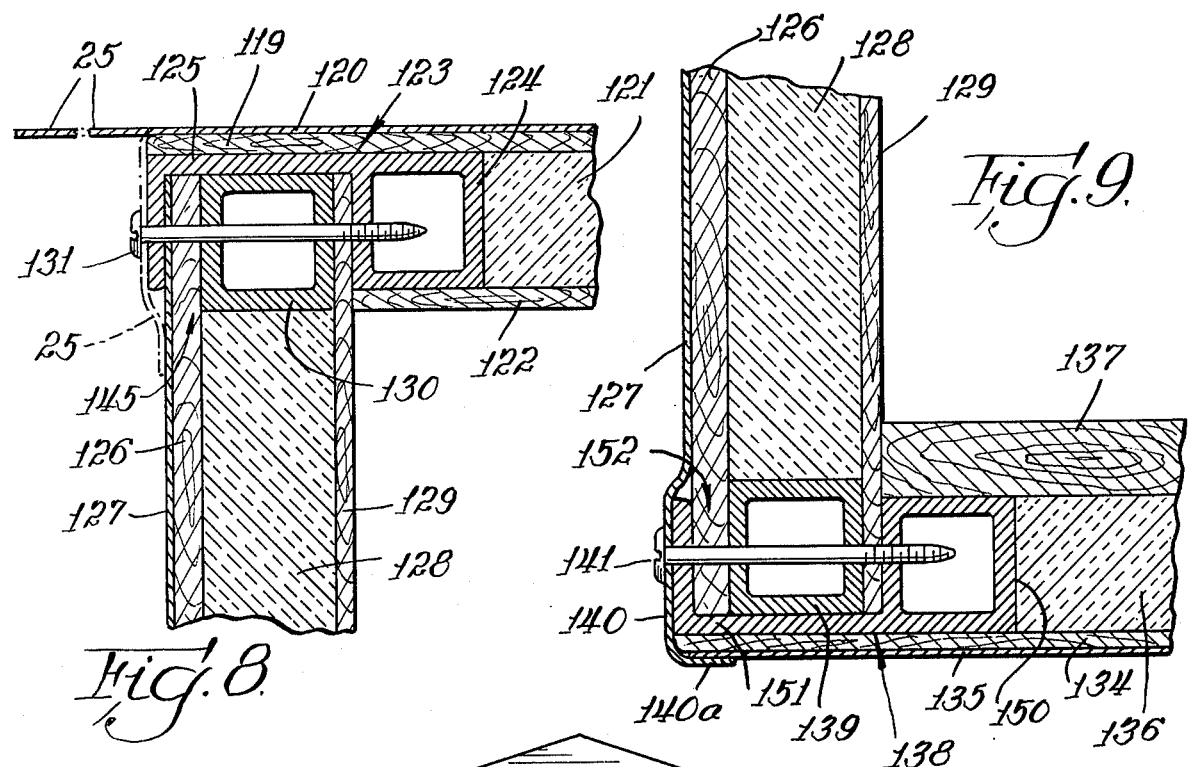
Fig. 8.
Fig. 9.
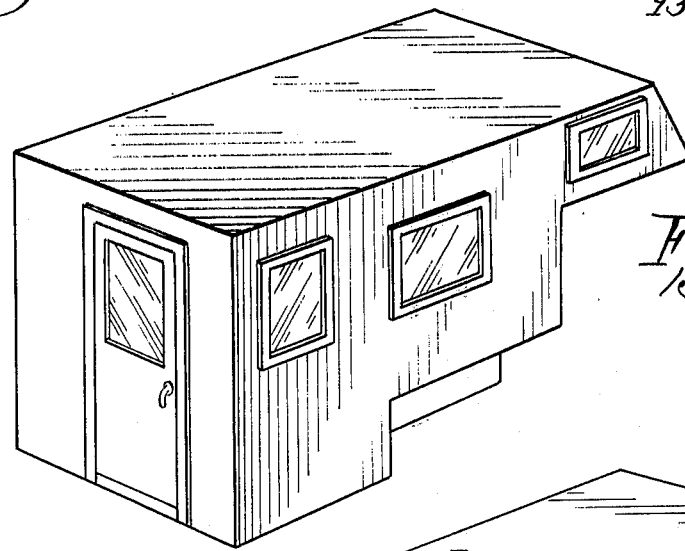
Fig. 10.
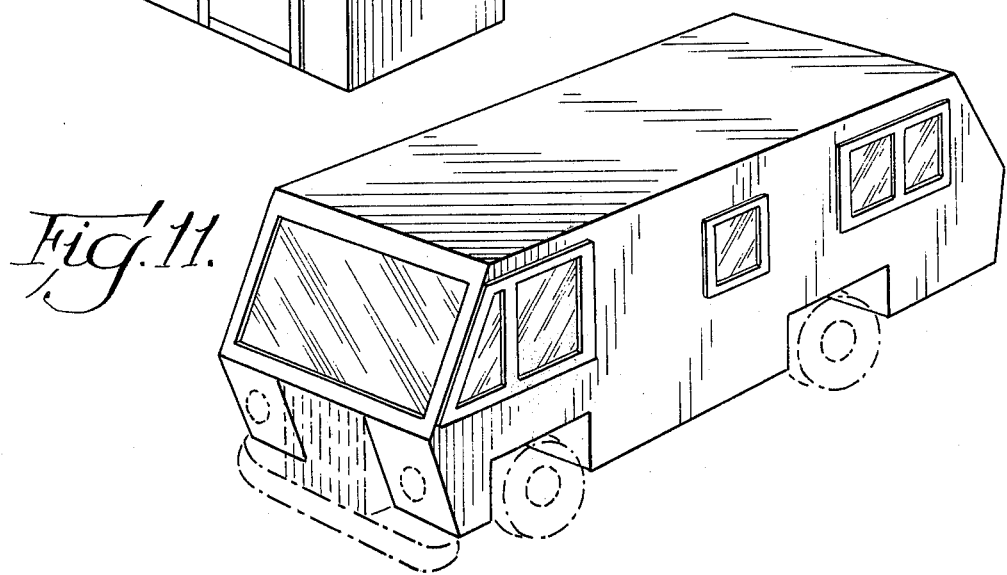
Fig. 11.

ENCLOSURE STRUCTURE

BACKGROUND OF THE INVENTION

Field of the Invention

The present invention relates to enclosure structures, and more particularly refers to such structures suitable for forming strong, readily assembled enclosures either for fixed use or for mobile use. Enclosure structure are known in the art and are used either in fixed locations or mounted on wheels or on automotive bodies for providing living accommodations for campers, or motor vehicles containing living quarters. Such structures are generally formed of separate prefabricated panels which are assembled together to form the enclosure. Many such structures have been disclosed in the art. In the case of structures which are subjected to movement such as for use for trailers or motor homes, it is particularly important to have a structure which is strong, does not readily collapse, and which can withstand the stress and strains provided by movement over highways. Such stresses include road shock, driving and brake stresses, and stresses caused by high winds or even shock of collision. In addition, where the structures are utilized for mobile vehicles, they must be relatively light in spite of being strong and rigid. Of the many prior art devices, some are sufficiently strong but too heavy. Others are light but not sufficiently strong. Others are difficult to fabricate and are not adaptable to ready assembly.

SUMMARY OF THE INVENTION

Accordingly, it is an object of the present invention to provide an enclosure structure which is strong and rigid. It is an additional object to provide such a structure which is still relatively light and well adapted for mobile use. It is an additional object to provide an enclosure structure wherein the separate wall panels may be separately prefabricated and readily assembled to form the enclosure. It is a further object to provide an enclosure structure which is relatively inexpensive to fabricate and utilizes readily available materials. It is still another object to provide an enclosure structure which is versatile and wherein the basic frame and panel structures may be utilized to construct many different forms of enclosures such as fixed enclosures, travel trailers, mobile homes, and motor homes. Still further objects and advantages of the invention will appear from the description and drawings.

According to the invention, an enclosure structure is formed having a frame fabricated in part of frame members having a tubular member and a channel forming member of L-shaped cross-section affixed thereto defining a channel in which other panels may be inserted and affixed. The result is an exceedingly strong structure which may be readily assembled and which is relatively inexpensive.

BRIEF DESCRIPTION OF THE DRAWINGS

In the drawings,

FIG. 1 is a perspective view of a travel trailer utilizing the structure of the invention.

FIG. 2 is a view of the right side of the travel trailer of FIG. 1 as viewed from the inside.

FIG. 3 is a top view looking from the inside of the trailer.

FIG. 4 is a left side view of the travel trailer of FIG. 1 looking from the inside.

FIG. 5 is a top view of the floor of the trailer of FIG. 1.

FIG. 6 is a front view from the inside of the travel trailer of FIG. 1.

FIG. 7 is a back view of the trailer of FIG. 1 from the inside.

FIG. 8 is a fragmentary cross-sectional view taken at the line 8—8 of FIG. 1, looking in the direction of the arrows.

FIG. 9 is a fragmentary cross-sectional view taken at the line 9—9 of FIG. 1, looking in the direction of the arrows.

FIG. 10 is a perspective view of a camper body adapted to be mounted in a pick-up truck, and FIG. 11 is a perspective view of a motor home utilizing the enclosure structure of the present invention.

DESCRIPTION OF THE PREFERRED EMBODIMENTS

Referring to FIG. 1, a travel trailer 10 is shown comprising a roadside sidewall 11, a top 12, an upper front panel 13, a lower front panel 14, and a wheel well 15 having wheels 16. A trailer hitch 18 is shown mounted to the front of the trailer. Front windows 19 and side windows 20, 21 and 22 are shown at the front and sides of the trailer. Utility access doors 23 and 24 are provided in the sidewall 11. In order to render the joints of the various panels waterproof, overlaps of the sheet metal are provided and include a top flange overlap 25, a front upper flange overlap 26, a front lower flange overlap 27, and rear flange overlaps 28 and 29. The metal skin of the sidewall provides bottom flange overlaps 30, 31 and 32.

Referring to FIG. 2, the right side or doorside frame 34 is shown comprising an upper frame member 35, lower frame members 36, 37 and 38, front frame members 39 and 40, and rear frame members 41 and 42. Additionally vertical frame members 1, 2, 3, 4, 5, 6, 7, and 8 connect the upper and lower frame members. Window frames and door frames are also formed by frame members, not enumerated. The various frame members are formed preferably of 7/8 inch tubular stock of rectangular cross-section and preferably of aluminum to provide good strength at low weight.

Referring to FIG. 3, the top frame 44 is shown comprising a right channel member 45 and a left channel member 46 having a structure as shown in FIG. 8. The frame is additionally comprised of transverse frame members 47, 48, 49, 50, 51, 52, 53, and 54. A light frame 55 is also provided, as are other structures shown but not enumerated.

Referring to FIG. 4, the left or roadside frame 58 is shown comprising a top frame member 59, bottom frame members 60, 61 and 62, end frame members 63, 64, 65, and 66. Additionally, vertical frame members 67, 68, 69, 70, 71, 72 and 73 are provided, as well as other structures shown but not enumerated. The frame members are also formed of 7/8 inch aluminum tubular stock of square cross-section.

Referring to FIG. 5, the floor frame 76 is shown comprising front channel members 77 and 78, rear channel members 79 and 80, and wheel well frame members 81. Additionally, transverse frame members 82, 83, 84, 85, 86, 87, 88, 89, and 90 provide the additional portions of the frame together with several frame members not enumerated.

Referring to FIG. 6, the front end frame is shown comprising channel frame members 92, 93, 94, and 95, and horizontal frame members 96, 97, and 98. Additionally, window frames 99 and 100 are provided.

Referring to FIG. 7, the back end frame is shown comprising channel frame members 104, 105, 106, and 107, and horizontal frame members 109, 110, 111, 112, 113, and 114.

Referring to FIG. 8, the top and side structure is shown. The top structure comprises an outer Luan wood or plywood sheet 119, an outer aluminum metal skin 120, a polystyrene foam core 121, an inner Luan or plywood sheet 122, and a channel frame member 153. The channel frame member 123 comprises a tubular body 124 and an L-shaped flange member 125 affixed thereto as by welding or forming an integral portion thereof, as formed by unitary extrusion, and cooperating to define a channel 145.

The sidewall is formed of an outer plywood sheet 126, an outer aluminum metal sheet 127 affixed thereto by an adhesive, a polystyrene foam core 128, an inner Luan or plywood sheet 129, and an aluminum tubular frame member 130. A top flange overlap comprising a margin of the metal sheet 120 is shown in broken lines folded over the vertical portion of the L-shaped flange member 125. A self-drilling, self-tapping sheet metal screw 131 affixes the overhang 25 to the flange member 125 and to the frame member 130.

Referring to FIG. 9, the bottom and side panel structure is shown. The bottom comprises an outer Laun or plywood sheet 134, an outer metal sheet 135, a polystyrene foam core 136, an inner plywood sheet 137, and a channel frame member 138. The channel frame member comprises a tubular member 150 and an L-shaped flange member 151 integral therewith and cooperating to define a channel 152. The sidewall structure is the same as that shown in FIG. 8, but additionally has a tubular frame member 139. A portion of the outer metal sheet 127 provides a overlap 140. A self-tapping, self-drilling screw 141 affixes the overlap 140 to the L-shaped flange 151 and the tubular frame member 139. Overlap 140 also preferably overlaps the outer metal sheet 135 on said bottom panel as shown at 140a, but need only overlap said channel member 138 to prevent seepage of moisture or foreign matter beneath said side panel outer sheet 127.

Referring to FIG. 10, a camper body is shown formed of a structure similar to that shown in FIGS. 1–9 having channel frame members at the edges of the top and bottom, with the side panels being received within the channels and affixed therein.

FIG. 11 illustrates a motor home utilizing the same basic frame structure as shown in FIGS. 1–10.

The structure of the present invention may be constructed as follows, although the method described is not to be regarded as limiting. In constructing each panel, the sheet aluminum is first cut to length. Various aluminum panel members are then cut to size and welded into one of the panel designs shown in the drawings. Polystyrene foam or any other suitable foamed polymer such as polyurethane, polyvinyl chloride, or phenol formaldehyde, is then cut into portions to fit between the frame members in the welded assembly. An adhesive is sprayed on one side of the foam and permitted to dry or passed through an oven. Adhesive is then sprayed on one side of a plywood member and permitted to dry or transported through an oven. The plywood is then placed on the welded assembly with the glue side of the wound engaging the glue side of the foam and welded assembly. The structure is then run through a nip roller at 40 p.s.i. at 10 to 20 feet per minute. The same procedure is then repeated with regard to the opposite side of the frame. The plywood panels are then sprayed and permitted to dry, and the aluminum panels of a material such as 0.019 inch aluminum is sprayed and permitted to dry. The metal is then placed over the plywood with the two adhesive-applied surfaces in engagement and transported through a nip roller at 100 p.s.i. at 16–20 feet per minute. The top and bottom panels are formed in the same manner, although the channel type frame members are utilized at the periphery. Additionally, on the top panel a margin of 1½ inches is permitted to hang over both sides, as well as the front and rear, and subsequently bent over and affixed to the sidewalls and front and rear walls.

In assembling the several panels, the bottom panel is first placed in horizontal position with the channels facing upwardly. Each side panel is then inserted into the channels of the bottom and self-tapping, self-drilling screws utilized to affix the panel in place. The top panel is then placed over the edges of the erected side panels and with the edges of the sidewalls engaged within the channels of the channel frame members of the top panel. The overlap margins of the sheet metal of the top panel are then folded over the channels and affixed to the sheet metal of the side panels. Self-tapping, self-drilling screws are then affixed through the flanges of the channel frame members, through the frame members of the side panels, and through the tubular members of the channel members to fix the assembly into place. Subsequently, the top and bottom end members are affixed in place in similar manner.

The enclosure structure of the present invention has many advantages over structures disclosed in the art. It is very versatile and may be utilized for the construction of motor homes, travel trailers, mobile homes, a frame vacation homes or permanent homes, truck bodies, certain types of vehicle cabs such as minibuses or school buses, and modular buildings such as used car offices, interplant offices, etc. The individual panels may be prefabricated and assembled on site. The structure may be readily assembled by placing the side panels into the channels of the top and bottom panels and the end panels subsequently affixed in the same manner. Self-tapping, self-drilling screws may be utilized to affix the structure permanently in place. The structure is extremely strong and resistant to twisting or breaking, and is extremely light. Additionally, it is relatively inexpensive to assemble and utilizes conventional readily available materials. The channel frame members may be extruded or assembled by welding. The tubular frame members without channels are readily available on the market. The structure is exceptionally well adapted for use on mobile vehicles, as it is extremely strong and resistant to twisting and bending and shaking commonly encountered during travel on highways.

It is to be understood that the invention is not to be limited to the exact details of operation or structure shown and described, as obvious modifications and equivalents will be apparent to one skilled in the art.

I claim:

1. An enclosure structure comprising a plurality of panels, at least one of said panels comprising a frame formed of frame members and means forming inner and outer panel surfaces affixed thereto, said frame having a frame member at one edge of said one panel comprising an elongate tubular member and a flange member affixed thereto, said tubular member and said flange member underlying the outer panel surface and cooperating to define a channel, and an edge of an adjacent panel being engaged in said channel.

2. An enclosure structure according to claim 1, in which the adjacent panel has a frame member at the edge engaged in said channel which comprises an elongate tubular member.

3. An enclosure structure according to claim 2, wherein fastening means secures said flange to said second named tubular member and the latter to the first named tubular member.

4. An enclosure member according to claim 1, wherein said tubular member has a square cross-section.

5. An enclosure structure according to claim 1, wherein said flange member is L-shaped.

6. An enclosure structure according to claim 5, wherein said flange member is integral with said tubular member.

7. An enclosur structure comprising a bottom, sidewall panels and end wall enclosure affixed thereto and a top panel, said top panel comprising a plurality of frame members and means forming inner and outer panel surfaces affixed thereto, the frame members at the lateral edges of said top comprising elongate tubular members and flange members affixed thereto underlying the outer panel surface and cooperating to define a channel, the upper edges of said sidewall panels being engaged in said channels and affixed thereto.

8. An enclosure structures according to claim 7, wherein said sidewall panels, end wall panels and top have plastic foam insulation therein, inner and outer wood sheets forming surfaces for said panels, and a metal sheet on the outer surface of said outer wood sheets.

9. An enclosure structure according to claim 8, wherein the metal sheet on said top has margins extending and overlapping said flange members and a portion of said sidewall panel members.

10. An enclosure structure according to claim 7, wherein said tubular members have square cross-sections.

11. An enclosure structure according to claim 7, wherein said flange members are L-shaped.

12. An enclosure structure according to claim 7, wherein said flange members are integral with said tubular members.

13. An enclosure structure according to claim 7, which is a travel trailer body and mounted on wheels.

14. An enclosure structure according to claim 7, which is a motor home body mounted on an automotive chassis.

15. An enclosure structure according to claim 7, which is a camper body adapted to be mounted on a pickup truck.

16. An enclosure structure comprising a top, side wall panels and end wall panels affixed thereto and a bottom panel, said bottom panel comprising a plurality of frame members and means forming inner and outer panel surfaces affixed thereto, the frame members at the lateral edges of said bottom comprising elongate tubular members and flange members affixed thereto underlying the outer panel surface cooperating to define a channel, the lower edges of said side wall panels being engaged in said channels and affixed thereto.

17. An enclosure according to claim 16, wherein said side wall panels, and bottom have plastic foam insulation therein, inner and outer wood sheets forming surfaces for said panels, and a metal sheet on the outer surface of said outer wood sheets.

18. An enclosure structure according to claim 17, wherein the metal sheet on said side wall panels has margins extending and overlapping said flange members and a portion of said bottom panel member.

19. An enclosure structure according to claim 16, wherein said tubular members have square cross-sections.

20. An enclosure structure according to claim 16, wherein said flange members are L-shaped.

21. An enclosure structure according to claim 16, wherein said flange members are integral with said tubular members.

22. An enclosure structure according to claim 16, which is a travel trailer body and mounted on wheels.

23. An enclosure structure according to claim 16, which is a motor home body mounted on an automotive chassis.

24. An enclosure structure according to claim 16, which is a camper body adapted to be mounted on a pickup truck.

25. An enclosure structure comprising side wall panels and end wall panels affixed thereto and top and bottom panels, said top and bottom panels comprising a plurality of frame members and means forming inner and outer panel surfaces affixed thereto, the frame members at the lateral edges of said top and bottom comprising elongate tubular members and flange members affixed thereto underlying the outer panel surface and cooperating to define a channel, the upper and lower edges of said side wall panels being engaged in said channels and affixed thereto.

26. An enclosure structure according to claim 25, wherein said side wall panels, end wall panels and top and bottom have plastic foam insulation therein, inner and outer wood sheets forming surfaces for said panels, and a metal sheet on the outer surface of said outer wood sheets.

27. An enclosure structure according to claim 26, wherein the metal sheet on said top has margins extending and overlapping said top flange members and a portion of said side wall panel members, and wherein the metal sheet on said side wall panels has margins extending and overlapping said bottom flange members and a portion of said bottom panel member.

28. An enclosure structure according to claim 25, wherein said tubular members have square cross-sections.

29. An enclosure structure according to claim 25, wherein said flange members are L-shaped.

30. An enclosure structure according to claim 25, wherein said flange members are integral with said tubular members.

31. An enclosure structure according to claim 25, which is a travel trailer body and mounted on wheels.

32. An enclosure structure according to claim 25, which is a motor home body mounted on an automotive chassis.

33. An enclosure structure according to claim 25, which is a camper body adapted to be mounted on a pickup truck.

* * * * *

UNITED STATES PATENT OFFICE
CERTIFICATE OF CORRECTION

Patent No. 3,968,989          Dated July 13, 1976

Inventor(s) Ronald Schippers

It is certified that error appears in the above-identified patent and that said Letters Patent are hereby corrected as shown below:

Column 3, Line 14 "153." change to --123.--

Column 4, Line 1 "wound" change to -- wood --

Claim 7, line 1 "enclosur" change to --enclosure--

Claim 7, line 2 "end wall enclosure" change to --end wall panel--

Signed and Sealed this

Nineteenth Day of October 1976

[SEAL]

Attest:

RUTH C. MASON
Attesting Officer

C. MARSHALL DANN
Commissioner of Patents and Trademarks